US006895384B1

(12) United States Patent
Dalal (10) Patent No.: US 6,895,384 B1
(45) Date of Patent: May 17, 2005

(54) METHOD AND SYSTEM FOR OPTIMIZING REQUEST-PROMISE WORKFLOWS

(75) Inventor: Mukesh Dalal, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/415,507

(22) Filed: Oct. 8, 1999

(51) Int. Cl.[7] .............................................. G06F 17/60
(52) U.S. Cl. ....................................................... 705/8
(58) Field of Search ..................................... 705/8, 80

(56) References Cited

U.S. PATENT DOCUMENTS

| | | | | |
|---|---|---|---|---|
| 5,369,570 A | * | 11/1994 | Parad ............................. | 705/8 |
| 5,943,244 A | * | 8/1999 | Crawford et al. ............. | 703/13 |
| 5,943,484 A | * | 8/1999 | Milne et al. ................. | 700/100 |
| 5,971,585 A | * | 10/1999 | Dangat et al. ............... | 700/102 |
| 5,974,395 A | * | 10/1999 | Bellini et al. .................. | 705/9 |
| 6,055,519 A | * | 4/2000 | Kennedy et al. .............. | 705/80 |
| 6,141,653 A | * | 10/2000 | Conklin et al. ................ | 705/1 |
| 6,151,582 A | * | 11/2000 | Huang et al. ................... | 705/8 |
| 6,157,915 A | * | 12/2000 | Bhaskaran et al. ............ | 705/7 |
| 6,188,989 B1 | * | 2/2001 | Kennedy ........................ | 705/8 |
| 6,321,133 B1 | * | 11/2001 | Smirnov et al. ............. | 700/100 |
| 6,374,227 B1 | * | 4/2002 | Ye ................................. | 705/7 |

FOREIGN PATENT DOCUMENTS

EP 1361531 A2 * 11/2003 ........... G06R/17/60

OTHER PUBLICATIONS

Helms et al., "Supply Chain Forecasting—Collaborative Forecasting Supports Supply Chain Management," Business Process Management Journal, vol. 6, No. 5, p. 392, 2000.*

Dobrin et al., "Make Better Schedules," Information Week Across the Business Supplement, pp. 18–24, Apr. 21, 1997.*

Davis, "Tough Customers," Manufacturing Systems Supply–Chain Strategies Supplement, pp. 16–27, 1994.*

"Manugistics Agrees to Acquire ProMIRA Software," PR Newswire, p. 0212NETH019, Feb. 12, 1998.* i2 Technologies website, as archived by web.archive.org on Jan. 31, 1998, [URL:http://www.i2.com/html/i2_solutions_for_demand_planning.html]. Retrieved Aug. 8, 2000.*

Blanchard, Benjamin and Water Fabrycky. Systems Engineering and Analysis. Prentice Hall. Sep. 10, 1999. pp. 211, 231–236.*

* cited by examiner

*Primary Examiner*—Susanna M. Diaz
(74) *Attorney, Agent, or Firm*—Baker Botts L.L.P.

(57) ABSTRACT

A system for optimizing request-promise workflows includes a first entity that provides supplies to a second entity. The second entity optimizes its production to generate a request for the supplies and reoptimizes in response to promises received from the first entity. The first entity may send a culprit promise that identifies the supply that is creating the shortage.

21 Claims, 6 Drawing Sheets

METHOD AND SYSTEM FOR OPTIMIZING REQUEST-PROMISE WORKFLOWS

TECHNICAL FIELD OF THE INVENTION

This invention relates generally to the field of optimization systems and more specifically to a method and system for optimizing request-promise workflows.

BACKGROUND OF THE INVENTION

The increasing complexity of interactions in finance, manufacturing, and other areas has highlighted the demand for sophisticated methods and systems for optimizing problem-solving among multiple entities. In many cases, multiple entities are given the task of solving a single problem. Often, the entities cannot plan together to determine the optimal solution to the problem. The entities interact only by sending request and promise messages to each other, which limits the opportunities for cooperative planning. Known methods and systems of optimizing request-promise workflows, however, have not been completely satisfactory with respect to effectiveness.

To illustrate the problem, consider the following example. Suppose that there are two entities, a supplier X and a producer Y, where X sells supplies to Y that Y needs to produce a product. Both X and Y perform optimization independently of each other, and they interact only by sending request and promise messages to each other. Entity Y has an external demand of 10 for each of its products C and D, and sells these products for $500 per unit. Entity X sells supplies A and B to Y for $200 per unit. Entity Y requires supplies A and B and an internal resource S to produce the products C and D, and Entity X requires an internal resource R to produce supplies A and B. Each unit of C requires 1 unit of A and 2 units of internal resource S, each unit of D requires 1 unit of B and S each, each unit of A requires 1 unit of R, and each unit of B requires 3 units of R. Only 20 units are available for each of the two internal resources R and S. Note that initially, Y would prefer to produce more units of D than of C, since D requires fewer units of internal resource S, while X would prefer to produce more units of A than of B, since A requires fewer units of internal resource R.

According to one known method, the producer makes a commitment to a client after its initial optimization. According to this method, Y assumes an unlimited supply of A and B. Y plans optimally, and decides to produce 5 units of C and 10 units of D. Y commits to delivering these amounts to the client. Y communicates to X a request for 5 units of A and 10 units of B. X plans optimally, resulting in producing 5 units of each of A and B. Because of the shortfall in B, Y fails in its commitment to deliver 10 units of D, and neither the supplies nor the producer have reached the optimal solution to the problem.

According to another known method, the producer makes a commitment to a client after receiving supplies that do not satisfy a request. According to this method, Y assumes an unlimited supply of A and B. Y plans optimally, and decides to produce 5 units of C and 10 units of D. Y communicates a request to X for 5 units of A and 10 units of B. X plans optimally, resulting in producing 5 units of each of A and B. Because of the shortfall in B, Y decreases its planned production of D to 5 units. Y commits to delivering 5 units of each of C and D, but again, neither the supplier nor the producer have reached the optimal solution to the problem.

While these approaches have provided improvements over prior approaches, the challenges in the field of optimization systems have continued to increase with demand for more and better techniques having greater effectiveness. Therefore, a need has arisen for a new method and system for optimizing request-promise workflows.

SUMMARY OF THE INVENTION

In accordance with the present invention, a method and system for optimizing request-promise workflows are provided that substantially eliminate or reduce the disadvantages and problems associated with previously developed systems and methods.

According to one embodiment of the present invention, a system for optimizing request-promise workflows is disclosed that includes a first entity and a second entity. The first entity produces supplies, and optimizes its production of the supplies to generate a promise for the supplies. The second entity optimizes its production of a demand to generate a request for the supplies. The second entity communicates the request to the first entity, and receives a promise for the supplies from the first entity based on the request. The second entity reoptimizes its production of the demand to generate a new request if the promise does not satisfy the request. More specifically, a communication link may be used to convey information between the first entity and the second entity.

According to one embodiment of the present invention, a method for optimizing request-promise workflows is disclosed. A demand is established, where supplies are needed to satisfy the demand, and the supplies are assumed to be unlimited. The production of the demand is optimized to generate a request for the supplies needed to satisfy the demand. The request is communicated to a supplier, a promise from the supplier is received, and it is determined whether the promise satisfies the request. If the promise does not satisfy the request, a new request in response to the promise is generated by reoptimization. More specifically, optimization to generate a request, communication of the request to a supplier, receipt of the promise from the supplier, determination of whether the promise satisfies the request, and reoptimization to generate a new request, may be repeated until the promise satisfies the request.

Technical advantages of the present invention include reoptimization that may be repeated until an optimal solution is achieved. Instead of performing only an initial optimization, as in the known methods, planning entities may perform multiple iterations of reoptimization in order to achieve an optimal solution. While the known methods optimize without input from the other entities, a planning entity may optimize using information communicated from the other entities. Moreover, different types of information may be communicated among the entities to be used in the reoptimization. For example, the entities may communicate limits on supplies or may even communicate optimization constraints and objectives. Planning entities may also identify supplies that are the cause of the shortages and that cannot be adjusted. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Figure 1:
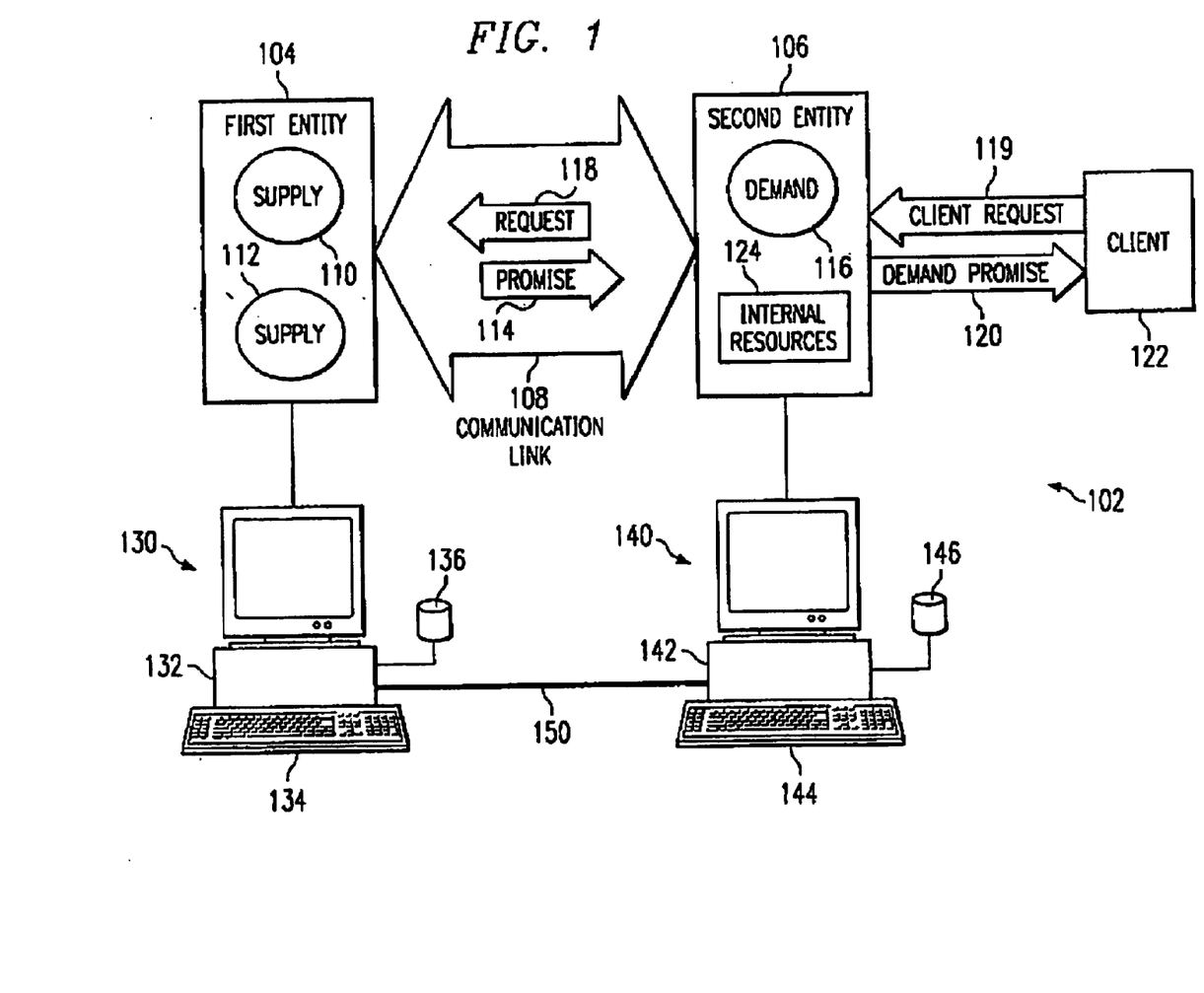
FIG. 1 is a block diagram of one embodiment of a system of optimizing request-promise workflows that may be used in accordance with the present invention.

FIG. 1 is a general block diagram of a system 102 for optimizing request-promise workflows. The system 102 in general includes a first entity 104, a second entity 106, and a communication link 108. The first entity 104 and the second entity may be, for example, a product manufacturer, a service provider, a financial institution, or any other entity that performs optimization. The communication link 108 may include, for example, a local area network, radio transmission, fiber optic transmission, or any other data communication network.

Specifically, the first entity 104 produces supplies 110 and 112, and optimizes is production of the supplies 110 and 112 to generate a promise 114 for the supplies 110 and 112. The second entity 106 satisfies a demand 116 by receiving the supplies 110 and 112 from the first entity 104. The second entity 106 optimizes its production of the demand 116 to generate a request 118 for the supplies 110 and 112. The second entity 106 may generate a request 118 in accordance with a client request 119 and internal resources 124. The internal resources 124 may be, for example, factory overhead, employee man-hours, factory output, computer time, or any other suitable resource. The second entity further communicates the request 118 to the first entity 104, and receives a promise 114 for the supplies 110 and 112 from the first entity 104 based on the request 118. The communication link 108 may be used to communicate the request 118 and the promise 114. If the promise 114 does not satisfy the request 118, the second entity 106 optimizes its production of the demand 116 to generate a new request.

The second entity 106 repeats the steps of optimizing its production to generate a request 118, communicating the request 118 to the first entity 104, receiving a promise 114 from the first entity 104, and reoptimizing its production to generate a new request, until the promise 114 satisfies the request 118. If the promise 114 satisfies the request 118, the second entity 106 communicates a demand promise 120 to a client 122. The first entity 104 optimizes its production of the supplies 110 and 112 independently of the second entity 106, and similarly the second entity 106 optimizes its production of the demand 116 independently of the first entity 104.

The system 102 may include one or more computer systems. For example, the first entity 104 may user a first computer system 130 including a processor 132, an input/output device 134, and a memory 136 to perform a portion or all of the information gathering, optimization, and communication functions. Similarly, the second entity 106 may use a second computer system 140 including a processor 142, an input/output device 144, and a memory 146 to performs a portion or all of the information gathering, optimization, and communication functions. The processors 132 and 142 process data, the memories 134 and 144 store data, and the input/output devices 136 and 146 are used to a user to interact with the computer systems 130 and 140. A local area network, wide area network, global network such as the Internet, or other data communication network may be used as a communication link 150 between computers 130 and 140. System 102 also contemplates human actions. For example, humans may transfer requests 118 or promises 114 to and from computers 130 and 140 or between entities 104 and 106. Humans may also generate requests 118 or promises 114 using the results of the optimization process. Additionally, humans may perform a portion or all of the optimization process to generate requests 118.

Figure 2:
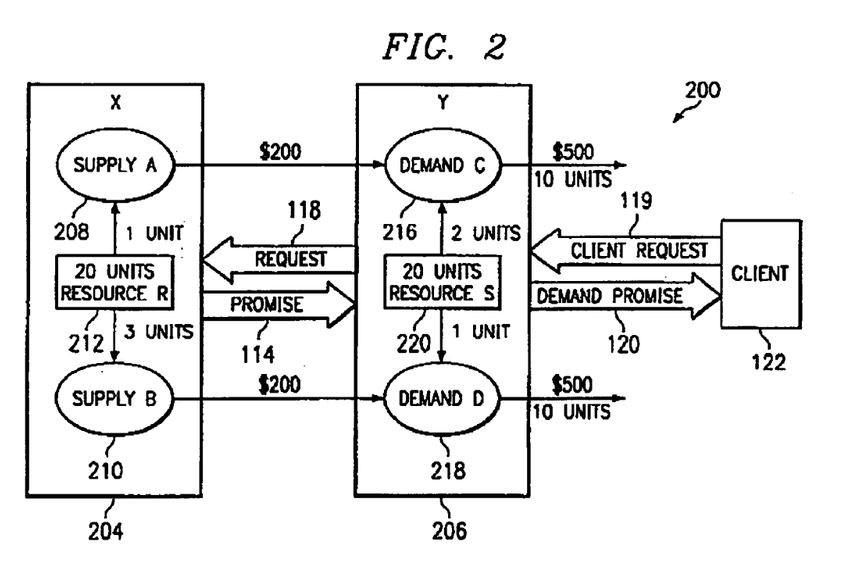
FIG. 2 is a block diagram of one embodiment of the system having one authority domain that provides supplies to another authority domain that may be used in accordance with the present invention.

FIG. 2 is a block diagram of one embodiment of a system 200 having one authority domain that provides supplies to another authority domain. Authority domain X 204 may be, for example, a supplier of the internal components of product, while an authority domain Y 206 may be, for example, a producer of the product that uses the internal components supplied by the authority domain X 204. X 204 sells a supply A 208 and a supply B 210 to Y 206 from $100 per unit. One unit of the internal resources R 212 is needed to produce one unit of supply A 208, and three units of internal resource R 212 to produce supply B 210. X 204 sells supply A 208 for $200 per unit and supply B 210 for $200 per unit. Internal resource R 212 is limited to 20 units.

Domain Y 206 produces a demand C 216 and a demand D 218. Two units of an internal resource S 220 are needed to produce one unit of demand C 216, and one unit of internal resource S 220 is needed to produce one unit of demand D 218. Internal resource S 220 is limited to 20 units. A client 122 sends a request 119 for 10 units each of C 216 and D 218. Y 206 also needs one unit of supply A 208 to produce one unit of demand C 216, and one unit of supply B 210 to produce one unit of demand D 218. Y 206 sells demand C for $500 per unit, and demand D 218 for $500 per unit. To request supplies, Y 206 communicates a request 118 to authority domain X 204. In response, X 204 communicates a promise 114 to authority domain Y 206. Y 206 may also send a demand promise 120 to the client 122.

Figure 3:
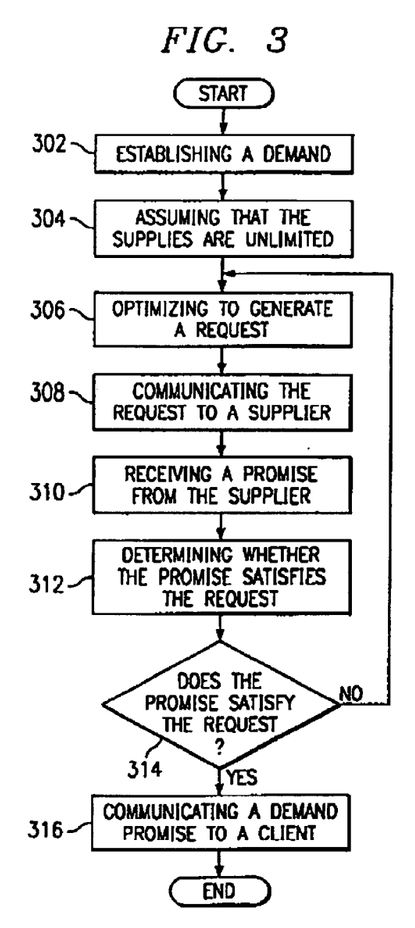
FIG. 3 is a flowchart demonstrating one embodiment of a method having one authority domain that provides supplies to another authority domain that may be used in accordance with the present invention.

FIG. 3 is a flowchart demonstrating one embodiment of a method of operation of system 200. In general, the authority domain Y 206 optimizes its production of demand 216 and 218 to generate a request 118 for the supplies 208 and 210 needed to satisfy the demands 216 and 218. Y 206 communicates the request 118 to X 204, and then receives a promise 114 from X 204. Y 206 then determines whether the promise 114 satisfies the request 118. If the promise 114 does not satisfy the request 118, Y 206 reoptimizes in order to generate a new request in response to the promise 118.

Specifically, the method begins at step 302, where Y 206 establishes a demand for 10 each of demand C 216 and demand D 218 in response to a request 119 from a client 122 and in accordance with internal resource S 220, which is limited to 20 units. Y 206 assumes that supply A 208 and supply B 210 are unlimited, at step 304. Y 206 optimizes its production of demands C 216 and D 218 to generate a request 118 for supplies A 208 and B 210 needed to satisfy the demands C 216 and D 218, at step 306. The request 118 may include a first request for supply A 208 and second request for supply B 210. In this example, the result of the optimization is a request for 5 units of C 216 and 10 units of D 218. Note that Y 206 would want to produce more units of D 218 than of C 216 because D 218 requires fewer units of internal resources than C 216 does.

Y 206 communicates the request 118 for 5 units of A 208 and 10 units of B 210 at step 308. X 204 optimizes in accordance with its internal resource R 212 which is limited to 20 units, and decides it can promise 5 units of A 208 and 5 units of B 210. Therefore, X 204 determines that it cannot meet the request. If X 204 could have met the request, it would send the supplies to Y 206. Note that in general X 204 wants to produce more units of A 208 than B 210, because A 208 requires fewer units of internal resource R 212 and B 210 does. Y 206 receives the promise 114 from X 204 at step 310, and determines whether the promise 114 satisfies the request 118 at step 312. In this first iteration, the promise of 5 units of B 210 does not satisfy the request, so the promise 114 does not satisfy the request 118, as determined at step 314. In general, Y 206 could determine whether the promise was within an acceptable range of the request, such that the promise could satisfy the request without being equal to the request.

Since the promise does not satisfy the request at step 314, Y 206 returns to step 306 and reoptimizes to generate a new request and response to the promise 114. Y 206 selects to consider both supplies in its reoptimization. Alternatively, Y 206 may have chosen to optimize only the supplies that are unsatisfied. Since B 210 is an unsatisfied promise, Y 206 may reoptimize by revising its assumption that B 210 is unlimited. In this case, Y 206 assumes that B 210 is limited to 5 and reoptimizes to produce 7 units of C 216 and 5 units of D 218. Y 206 communicates the request 118 for 7 units of A 208 and 5 units of B 210 at step 308. X 204 optimizes, resulting in a promise of 7 units of A 208 and 4 units of B. Y 206 receives the promise 114 from X 204 at step 310.

Y determines that the promise 114 does not satisfy the request 118 at step 312, because the promise of 4 units of B 210 does not satisfy the request of 5 units of B 210. Since the promise 114 does not satisfy the request 118 in this second iteration as determined at step 314, the method returns to step 306, where Y 206 reoptimizes to generate a new request. In its reoptimization, Y 206 assumes that B 204 is limited to 4. Y 206 reoptimizes, and decides to produce 8 units of C 216 and 4 units of D 218, which requires 8 units of A 208 and 4 units of B 210. Y 206 communicates the request 118 to X 204 at step 308. X 204 optimizes, resulting in a promise of 8 units of A 208 and 4 units of B 210. Y 206 receives the promise 114 at step 310, and determines that the promise 114 of the third iteration satisfies the request 118 at step 312, and then at step 314 the method proceeds to step 316, where Y 206 communicates a demand promise 120 to a client 122, and the method terminates. The profit for X 204 is $2,400 and for Y 206 is $3,600, which are optimal for both X 204 and Y 206.

The method may also be used to exchange arbitrary optimization problems instead of merely exchanging quantities for the request and promises. Optimization problems may be used in any of the scenarios in this description, and may be represented in several different ways, for example, a math programming problem, a linear problem, or a mixed-integer-linear problem. Specifically, at step 302, Y 206 establishes demand C 216 and demand D 218 in response to a request 11 for 10 units each of C 216 and D 218. The production of C 216 and D 218 is constrained by a limit of 20 units of internal resource S, which may be used for the production of either C 216 or D 218, but not both, due to high setup costs. Y 206 assumes that supplies A 208 and B 210 are unlimited at step 304. Y 206 optimizes its demand to generate a request at step 306, and decides to use internal resource S 220 to produce D 210 instead of C 216. Instead of communicating a request for a number of supplies, at step 308 Y 206 communicates the following request 118 to X 204 based on client 122 requests 119 and internal resource S 220:

Maximize B

Such that $A \leq 10$ and $B \leq 10$ The request 118 now includes an objective and constraints. In this embodiment, "maximize B" is the objective, and "$A \leq 10$" and "$B \leq 10$" are the constraints. X 204 adds the two constrains sent by Y 206 to its own optimization problem. X 204 optimizes according to the request, cost and internal resources, yielding, for example, the following optimization problem, which it sends to Y 206 as a promise 114:

Maximize A+B

Such that $A + 3B \leq 20$

Y 206 receives the promise from X 204 at step 310. Y 206 determines whether the promise 114 satisfies the request 118 at step 312. Y 206 determines the promise does not satisfy the request so, at step 314 the method returns to step 306, where Y 206 reoptimizes to generate a new request. Y 206 adds the two constraints sent by X 204 into its own optimization problem, and then optimizes. Y 206 decides that making C 216 instead of D 218 is more profitable. Y 206 generates the following request 118:

Maximize A

Such that $A \leq A10$ and $B \leq 10$

Y 206 communicates the request 118 to X 204 at step 308. X 204 adds the two constraints sent by Y 206 to its own optimization problem, and then optimizes. X 204 and Y 206 continue to exchange optimization problems until X 204 communicates a promise that is acceptable to Y 206. For example, at step 310, Y 206 receives a promise for 10 of A and 0 of B. from the supplier, and at step 312 determines whether the promise satisfies the request. Y 206 accepts the solution at step 314, and then proceeds to step 316, where it communicates a demand promise 120 to a client 122. After that, the method terminates.

Figure 4:
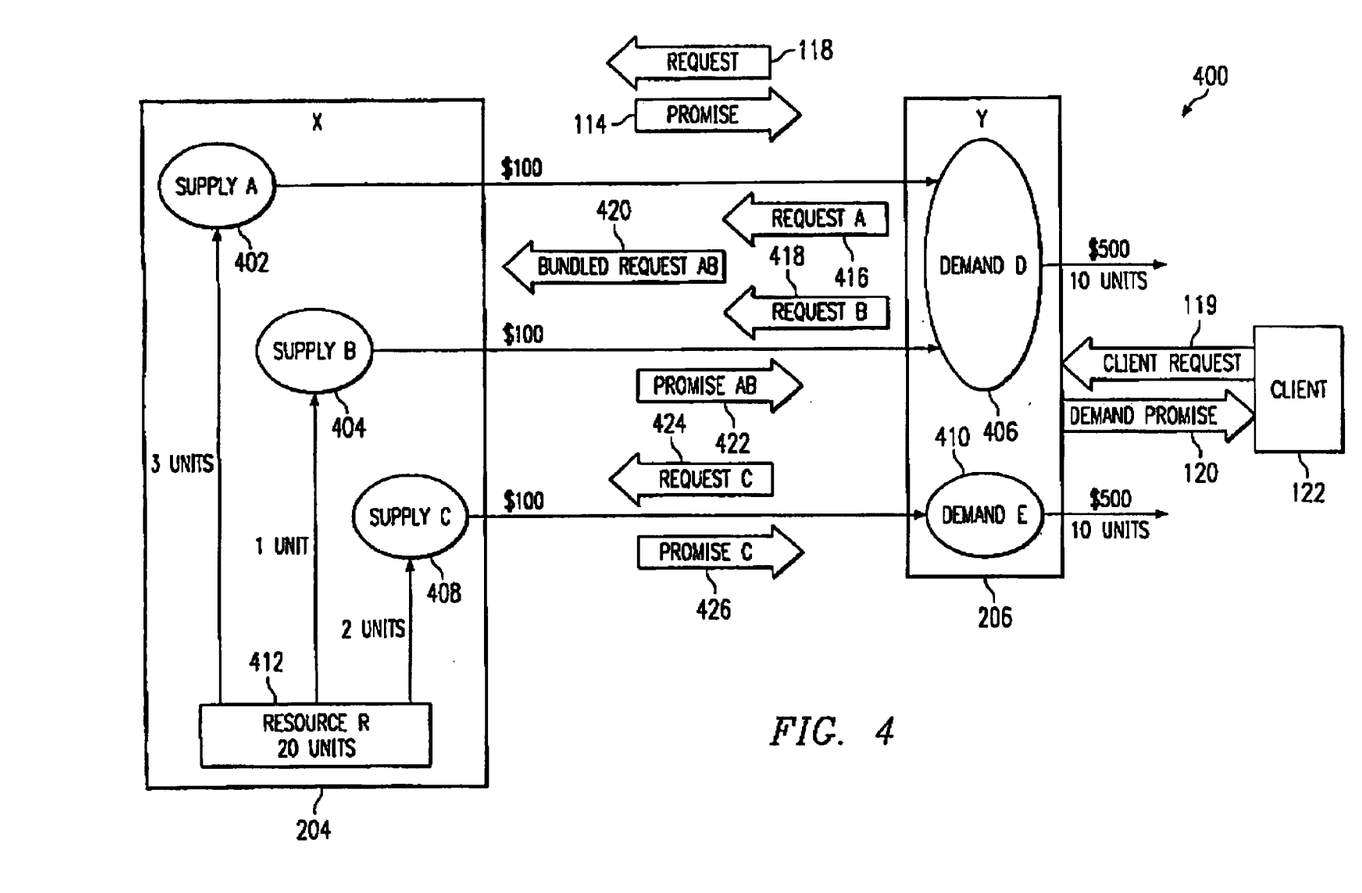
FIG. 4 is a block diagram of one embodiment of the system having one authority domain that provides multiple supplies for a demand of another authority domain that may be used in accordance with the present invention.

FIG. 4 is a block diagram of one embodiment of a system 400 having one authority domain that provides multiple supplies for a demand of another authority domain. The system includes an authority domain X 204 supplies all the components of products produced by authority domain Y 206. X 204 sells supplies A 402 and B 404 each for $100 per unit to Y 206. One unit of supply A 402 and one unit of supply B 404 are needed to produce one unit of demand D 406. One unit of supply C 408 is needed to produce one unit of demand E 410. Three units of an internal resource R 412 of X 204 are needed to produce one unit of supply A 402, one unit of R 412 is needed to produce one unit of supply B 404, and two units of R 412 are needed to produce one unit of supply C 408. Resources R 412 is limited to 20 units. Y sells D 406 and E 410 each for $500 per unit, in response to a client request 119 for 10 each of D 406 and E 410.

In this embodiment, requests for individual supplies are bundled into a bundled request. A bundled request may include, for example, supplies needed to fulfil one demand. For example, a request 416 for A (5 of A) and a request 418 for B (5 of B) are bundled into a bundled request 420 for A and B (5 of A, 5 of B). The bundled request 420 for A and B includes a request for supplies needed to fulfill demand D 406. In response to the bundled request 420 for A and B, X 204 sends out one promise 422 for A and B. After bundling, a bundled request may include only one request. For example, since one supply C is needed to satisfy demand E, the bundled request 424 for C includes only the request 424 for C. A promise 426 for C is sent in response to the request 424 for C.

For each promise that does not satisfy its corresponding request, at least one supply that caused the shortage may be identified as a culprit. For example, suppose that supply A 402 is a culprit. In response to a bundled request 420 for A and B (5 of A, 5 of B), a promise 422 for A and B may identify supply A 402 as the culprit (4 of A, 4 of B, culprit A). According to this embodiment, the supply of each culprit may be constrained by the promise for the culprit. For example, suppose that Y 206 assumes an unlimited supply of A 402, B 404, and C 408. After optimizing, suppose that Y 206 communicates the following requests to X 204: (5 of A, 5 of B), (4 of A, 4 of C) and (3 of C), and receives the following promises from X 204: (4 of A, 4 of B, culprit A), (4 of A, 4 of C) and (2 of C, culprit C). When reoptimizing, Y 206 assumes that the promises of A and B are constraints, that is, A is limited to 8 (sum of 4 and 4), B is limited to 10 (same as before), and C is limited to 6 (sum of 4 and 2). By identifying culprits, Y 206 can reoptimize using the limited culprit supply as a constraint, while assuming that the non-culprit supplies are plentiful.

Figure 5:
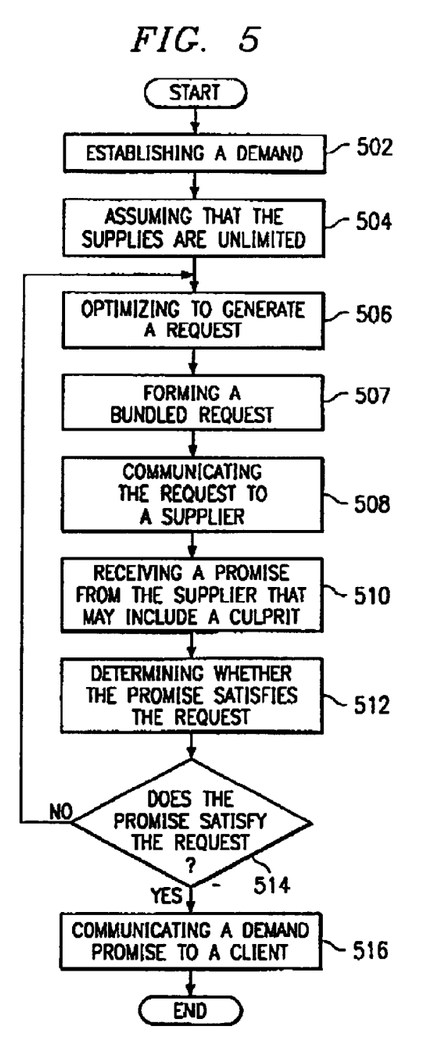
FIG. 5 is a flowchart demonstrating one embodiment of the method having one authority domain that provides multiple supplies for a demand of another authority domain that may be used in accordance with the present invention.

FIG. 5 is a flowchart demonstrating one embodiment of a method of operation of system 400. The method begins at step 502, where Y 206 establishes a demand D 406 and a demand E 410 based on a client request 119 for 10 each of D 406 and E 410 and internal resources. Y 206 assumes that supplies of A 402, B 404 and C 408 are unlimited at step 504. Y 206 optimizes its production of the demands D 406 and E 410 at step 506, and decides to produce 10 units each of D 406 and E 410, which requires 10 units each of supplies A 402, B 404 and C 408. Y 206 forms bundled requests for (10 of A, 10 of B) and (10 of C) at step 507. Y 206 communicates the bundled requests to X 204 at step 508. X 204 optimizes, and decides it can produce 10 of C 408 and communicates promises for (0 of A, 0 of B, culprit A) and (10 of C) from X 204. Y 206 receives the promises at step 510.

Y 206 determines that the promises do not satisfy the requests at step 512. Since the promises do not satisfy the requests, at step 514, Y 206 returns to step 506 and reoptimizes to generate a new request. Y 206 assumes that the supply of A 402 is limited to 0 by the promise of culprit A. Y 206 optimizes, and decides to produce 10 units of E 410, which requires 10 units of C 408. Y 206 forms bundled requests for (10 of C) at step 507. Y 206 communicates the bundled request for (10 of C) to X 204 at step 508. X 204 optimizes and decides it can supply 10 units of C 408. Y 206 receives a promise for (10 of C) from X 204 at step 510. Y 206 determines that the promise satisfies the request at step 512. Since the promise satisfies the request as determined at step 514, Y 206 proceeds to step 416, where Y 206 communicates a demand promise 120 for 10 units of E 410 to a client 122, and the method terminates.

Figure 6:
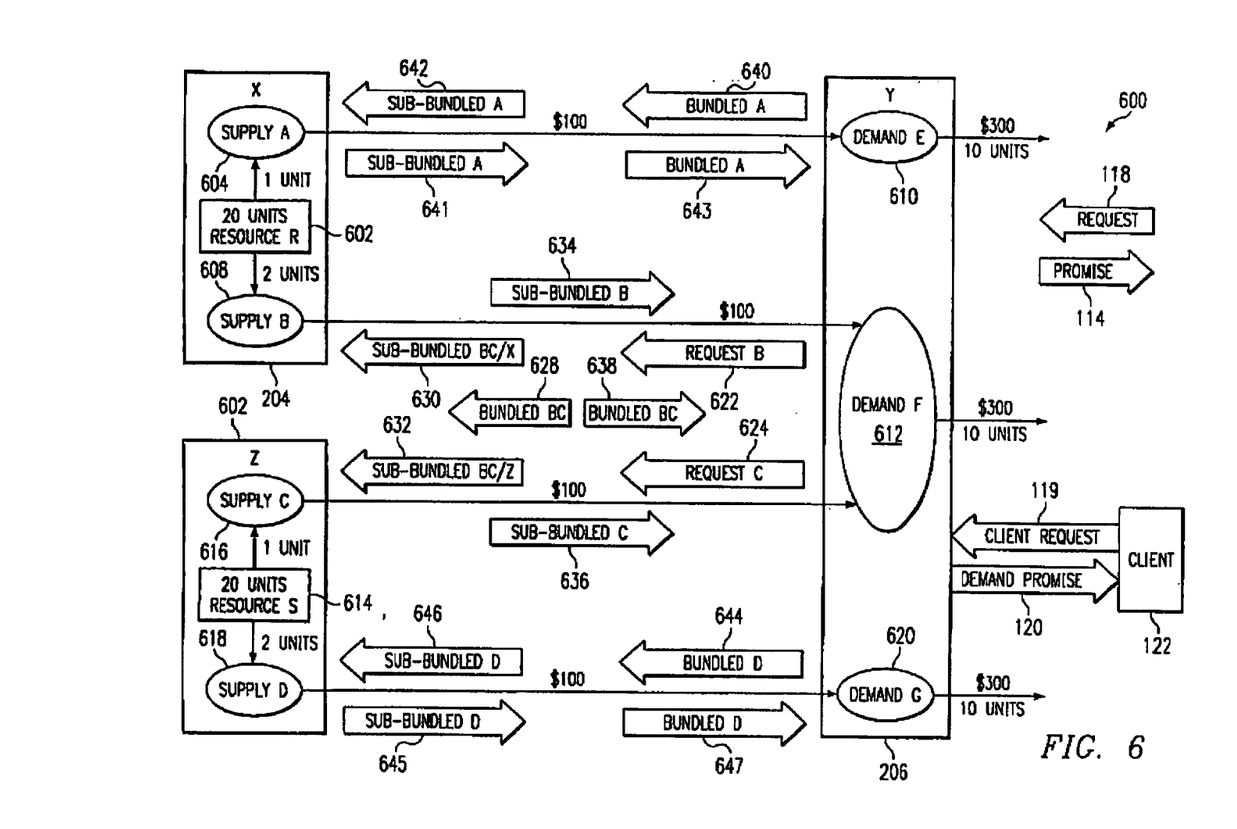
FIG. 6 is a block diagram of one embodiment of the system having two authority domains that provide supplies to a third authority domain that may be used in accordance with the present invention.

FIG. 6 is a block diagram of one embodiment of a system 600 having two authority domains that provide supplies to a third authority domain. System 600 includes an authority domain X 204 and an authority domain Z 602 that provides supplies to an authority domain Y 206. In X 204, one unit of internal resource R 602 is needed to produce one unit of supply A 604, and two units of internal resource R 602 are needed to produce one unit of supply B 608. Internal resource R 602 is limited to 20 units. X 204 sells supply A 604 and supply B 608 each for $100 per unit to Y 206. In Z 602, one unit of internal resource S 614 is needed to produce one unit of supply C 616, and two units of internal resources S 614 are needed to produce one unit of supply D 618. Internal resource S 614 is limited to 20 units. Z 602 sells supply C 616 and supply D 618 each for $100 per unit to Y 206. Y 206 needs one unit of supply A 604 to produce one unit of demand E 610, one unit of supply B 608 and one unit of supply C 616 to produce one unit of demand F 612, and one unit of supply D 618 to produce one unit of demand G 620. Y 206 sells demands E 610, F 612, and G 620 each for $300 per unit based on a request 119 from a client 122 for 10 units each of E 610, F 612, and G 620.

According to this embodiment, a request for individual supplies may be bundled into a bundled request. For example, a request 622 for supply B and a request 624 for supply C may be bundled into a bundled request 628 for supplies B and C. Additionally, a bundled request may be split into sub-bundled requests, for example, sub-bundled requests corresponding to different authority domains such that each authority domain receives only sub-bundled requests. For example, X 206 places B and C in a bundled request 628 since both B and C are used to produce F. However, since different suppliers produce B and C, Y 206 splits the bundled request 628 into a sub-bundled request 630 for B that is communicated to authority domain X 204, and a sub-bundled request 632 for C that is communicated to authority domain Z 602. A sub-bundled request may include the same request as the bundled request. For example, a bundled request 640 for A is the same as the sub-bundled request 642 for A, since the supply for demand D 610 comes from only one authority domain X 204. Similarly, the sub-bundled request 646 for D includes the same request as the bundled request 644 for D.

The sub-bundled promises are then recombined into bundled promises by Y 206 for further optimization. For example, the sub-bundled promise 634 for B sent from authority domain X 204 and the sub-bundled promise 636 for C sent from authority domain Z 602 may be bundled into bundled promise 638 for B and C. Similarly, the sub-bundled promise 641 for A sent from authority domain X 204 may be bundled into bundled promise 643 for A, and the sub-bundled promise 645 for D sent from authority domain Z 602 may be bundled into bundled promise 647 for D.

Since multiple suppliers are providing the supplies, culprits from larger sub-bundled requests may be discarded for more accurate reoptimization. For example, suppose that Y 206 communicates sub-bundled requests 630 (10 of B) to X 204 and 632 (10 of C) to Z 602, both generated from the same bundled request 628 (10 of B, 10 of C). Now suppose that the promise 634 from X is (9 of B, culprit B) and the promise 632 from Z is (4 of C, culprit C). Culprit B is discarded since it is part of the larger sub-bundled promise. The resulting bundled promise is (4 of B, 4 of C, culprit C). For reoptimization, Y 206 assumes that C is limited, but B is unlimited. Moreover, according to this embodiment, if a sub-bundled promise from one authority domain is smaller than the corresponding sub-bundled promise from another authority domain, then all the culprits from all the other sub-bundled promises are discarded. For example, if X 204 had communicated an additional sub-bundled promise of (10 of A, culprit A), culprit A may be discarded because culprit C corresponds to a smaller sub-bundled promise. The resulting bundled request would be (10 of A).

Figure 7:
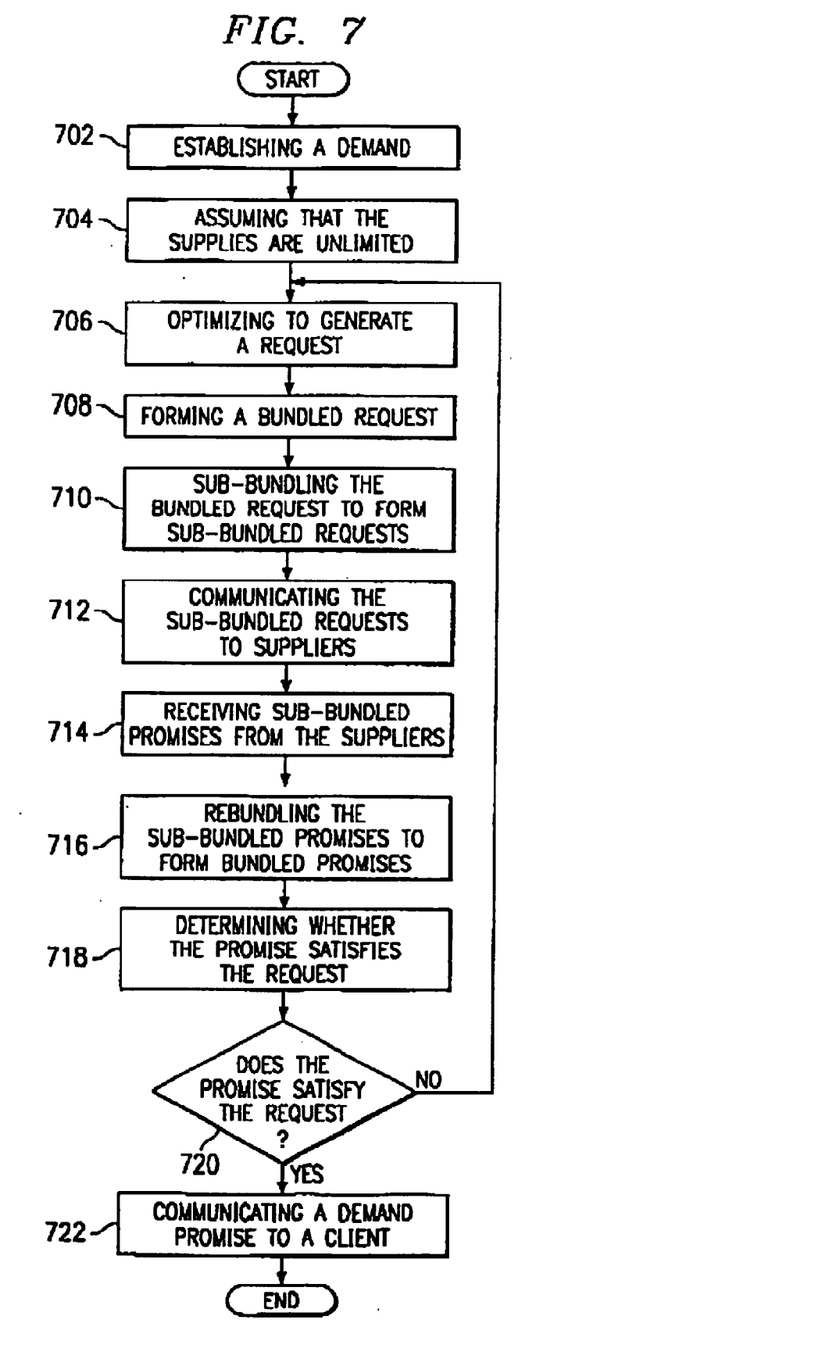
FIG. 7 is a flowchart demonstrating one embodiment of the method having two authority domains that provide supplies to a third authority domain that may be used in accordance with the present invention.

FIG. 7 is a flowchart demonstrating one embodiment of a method of operation of system 600. The method begins at step 702, where Y 206 establishes demands E 610, F 612, and G 620 in accordance with a client request 119 for 10 units each of demands E 610, F 612, and G 620 and in accordance with internal resources. Y 206 assumes that supplies A 604, B 608, C 616 and D 618 are unlimited at step 704. Y 206 optimizes its production to generate a request at step 706, and decides to produce 10 units each of E 610, F 612, and G 620, which require 10 units each of supplies A 604, B 608, C 616 and D 618.

Y 206 forms a bundled request 640 for (10 of A), bundled request 628 for (10 of B, 10 of C), and bundled request 644 for (10 of D) at step 708. In this embodiment, each bundled request contains the supplies required for one demand, for example, bundled request (10 of B, 10 of C) contains the supplies required for demand F 612. Y 206 sub-bundles the bundled requests into a sub-bundled request 642 for (10 of A), sub-bundled request 630 for (10 of B), sub-bundled request 632 for (10 of C), and sub-bundled request 646 for (10 of D) at step 710. In this embodiment, the bundled requests are sub-bundled into sub-bundled requests according to the authority domain that provides the supplies. The bundled requests for (10 of A), (10 of B, 10 of C), (10 of D) are sub-bundled into sub-bundled requests for (10 of A) and (10 of B) to X 204, and sub-bundled requests for (10 of C) and (10 of D) to Z 602.

Y communicates the sub-bundled requests to X 204 and Z 602 a step 712. Y 206 receives a sub-bundled promise 641 for (10 of A) and sub-bundled promise 634 for (5 of B, culprit B) from X 204, and sub-bundled promise 636 for (10 of C) and sub-bundled promise 645 for (5 of D, culprit D) from Z 602 at step 714. Y 206 bundles these sub-bundled promises into a bundled promise 643 for (10 of A), bundled promise 638 for (5 of B, 10 of C, culprit B), and bundled promise 647 for (5 of D) at step 716. Since sub-bundled promise of culprit D is the same size as the sub-bundled promise of culprit B, the promise of D may be retained or discarded, depending on the optimization process. In this example, Y 206 discards culprit D and retains the promise for culprit B as a constraint.

Y 206 determines that the promise does not satisfy the request at step 718. Because the promise does not satisfy the request, at step 720, Y 206 returns to step 706 and reoptimizes, assuming that the supply for B 608 is limited to 5 by the promise for culprit B. Y 206 reoptimizes and decides to produce 10 units of E 610, 5 units of F 612, and 10 units of G 620. Y 708 forms bundled requests for (10 of A), (5 of B, 5 of C), (10 of D) at step 708. Y 206 sub-bundles the bundled requests into sub-bundled requests for (10 of A), (5 of B), (5 of C), and (10 of D) at step 710. Y 206 communicates the sub-bundled requests for (10 of A) and (5 of B) to X 204, and the sub-bundled requests for (5 of C) and (10 of D) to Z 602 at step 712. Y 206 receives a sub-bundled promise for (10 of A) and (5 of B) from X 204, and sub-bundled promises for (5 of C) and (7.5 of D, culprit D) to Y 206 from Z 602 at step 714. Y 206 bundles these sub-bundled promises into bundled promises for (10 of A), (5 of B, 5 of C), (7.5 of D, culprit D) at step 716.

Y 206 determines that the promise does not satisfy the request at step 718. Because the promise does not satisfy the request, at step 720, Y 206 returns to step 706 and reoptimizes, assuming that the supply for D 618 is limited to 7.5 by the promise for culprit D. Y 206 decides to produce 10 units of E 610, 5 units of F 612, and 7.5 units of G 620. Y 206 forms the bundled requests for (10 of A), (5 of B, 5 of C), (7.5 of D) at step 708. Y 206 forms the sub-bundled requests for (10 of A) and (5 of B) to X 204, and (5 of C) and (7.5 of D) to Z 602 at step 710. Y 206 communicates the sub-bundled requests to X 204 and Z 602 at step 712. Y 206 receives a sub-bundled promises for (10 of A) and (5 of B) from X 204 and sub-bundled promises for (5 of C) and (7.5 of D) from Z 602 at step 714. Y 206 bundles these sub-bundled promises into bundled promises for (10 of A), (5 of B, 5 of C), (7.5 of D) at step 716.

Y 206 determines that the promise satisfies the request at step 718, and at step 720, Y 206 proceeds to step 722. Y 206 communicates a demand promise for 10 units of E 610, 5 units of F 612, and 7.5 units of G 620 to a client 122 at step 722, and the method terminates.

Technical advantages of the optimization system include reoptimization that may be repeated until an optimal solution is achieved. Instead of performing only an initial optimization, as in the known methods, planning entities may perform multiple iterations of reoptimization in order to achieve an optimal solution. While the known methods optimize without input from the other entities, a planning entity may optimize using information communicated from the other entities. Moreover, different types of information may be communicated among the entities to be used in the reoptimization. For example, the entities may communicate limits on supplies or may even communicate optimization constraints and objectives. Planning entities may also identify supplies that are the cause of the shortages and that cannot be adjusted.

Although an embodiment of the invention and its advantages are described in detail, a person skilled in the art could make various alternations, additions, and omissions without departing from the spirit and scope of the present invention as defined by the appended claims.

What is claimed is:

1. A system for optimizing a request-promise workflow between a first entity and a second entity downstream form the first entity, the first entity supplying supplies to the second entity in response to demand for supplies from the second entity, the system being associated with the second entity and comprising one or more processing units and one or more memory units collectively operable to:

establish a demand at the second entity for one or more supplies supplied by the first entity, the demand for the supplies based at least in part on a demand placed on the second entity by a third entity downstream from the second entity;

optimize at the second entity the second entity's production associated with meeting the demand from the third entity to generate the request for the supplies;

communicate the request for the supplies from the second entity to the first entity, a system associated with the first entity operable to optimize the first entity's production of the supplies using the request for the supplies as a first constraint to generate a promise for the supplies based on the request for the supplies;

receive at the second entity the promise for the supplies from the first entity, the promise for the supplies having been generated according to an optimization for the first entity's production of the supplies using the request for the supplies as a first constraint, the promise for the supplies identifying a culprit as a cause for the promise for the supplies not satisfying the request for the supplies if the promise for the supplies does not satisfy the request for the supplies;

if the promise for the supplies does not satisfy the request for the supplies, generate at the second entity a second constraint according to the culprit identified in the promise for the supplies; and if the promise for the supplies does not satisfy the request for the supplies, reoptimize at the second entity the second entity's production associated with meeting the demand from the third entity using the second constraint generated according to the culprit identified in the promise for the supplies to generate a new request for the supplies.

2. The system of claim 1, wherein the system associated with the first entity is operable to repeat the following until the promise for the supplies satisfies the request for the supplies:

receiving a request for the supplies from the second entity;

reoptimizing the first entity's production of the supplies using the request for the supplies as a constraint to generate the promise for the supplies; and communicating the promise for the supplies to the second entity.

3. The system of claim 1, further operable to repeat the following until the promise for the supplies satisfies the request for the supplies:

optimizing the second entity's production associated with meeting the demand from the third entity to generate a request for the supplies;

communicating the request for the supplies to the first entity;

receiving a promise for the supplies from the first entity based on the request for the supplies, the promise for the supplies having been generated according to an optimization of the first entity's production of the supplies using the request for the supplies as a first constraint, the promise for the supplies identifying a culprit as a cause for the promise for the supplies not satisfying the request for the supplies if the promise for the supplies does not satisfy the request for the supplies;

if the promise for the supplies does not satisfy the request for the supplies, generating a second constraint according to the culprit identified in the promise for the supplies; and reoptimizing the second entity's production associated with meeting the demand from the third entity using the second constraint generated according to the culprit identified in the promise for the supplies to generate a new request for the supplies if the promise for the supplies does not satisfy the request for the supplies.

4. The system of claim 1, wherein:

the system associated with the first entity is further operable to optimize the first entity's production of the supplies independently of the second entity; and the system associated with the second entity is further operable to optimize the second entity's production associated with meeting the demand from the third entity independently of the first entity.

5. The system of claim 1, wherein:

the request for the supplies comprises a first request for a first supply and a second request for a second supply; and the promise for the supplies comprises a first promise for the first supply and a second promise for the second supply, the promise for the supplies identifying the second supply as the culprit if the promise for the supplies does not satisfy the request for the supplies.

6. The system of claim 5, wherein:

the second promise does not satisfy the second request for the second supply, the promise for the supplies identifying the second supply as the culprit; and the system associated with the second entity is further operable to optimize the second entity's production associated with meeting the demand from the third entity to generate a new request for the supplies using the second promise for the second supply to generate the second constraint.

7. The system of claim 1, wherein:

the request for the supplies comprises a bundled request for at least two supplies for the second entity's production associated with meeting the demand from the third entity;

the promise for the supplies in response to the bundled request for the at least two supplies comprises a first promise, a second promise, and the culprit, the culprit identifying the second promise as the cause for the promise for the supplies not satisfying the bundled request for the at least two supplies; and the system associated with the second entity is operable to reoptimize the second entity's production associated with meeting the demand from the third entity to generate a new request for the at least two supplies using the second promise to generate the second constraint.

8. The system of claim 1, wherein:

the promise for the supplies comprises an optimization objective and a promise constraint; and the system associated with the second entity is operable to reoptimize the second entity's production associated with meeting the demand from the third entity to generate a new request for the supplies using the promise constraint and the optimization objective.

9. The system of claim 1, wherein the system associated with the second entity is operable to generate a request for the supplies in accordance with one or more internal resources.

10. The system of claim 1, wherein the system associated with the second entity is operable to communicate a demand promise associated with meeting the demand from the third party to the third entity if the promise for the supplies satisfies the request for the supplies.

11. A computer-implemented method for optimizing a request-promise workflow, the method performed using a computer system comprising one or more processing units and one or more memory units, the method comprising:

using the computer system, establishing at an entity a demand for one or more supplies needed to meet a demand from a third party;

using the computer system, optimizing at the entity, based at least in part on an assumption that the supplies are unlimited, the production associated with the meeting the demand from the third part to generate a request for the supplies needed to meet the demand from the third party;

using the computer system, communicating the request for the supplies from the entity to a supplier of the supplies;

using the computer system, receiving at the entity a promise for the supplies from the supplier, the promise for the supplies having been generated according to an optimization of the supplier's production of the supplies using the request for the supplies as a first constraint, the promise for the supplies identifying a culprit as a cause for the promise for the supplies not satisfying the request for the supplies if the promise for the supplies does not satisfy the request for the supplies;

using the one or more computer systems, determining at the entity whether the promise for the supplies satisfies the request for the supplies; and using the one or more computer systems, if the promise for the supplies does not satisfy the request for the supplies, generating at the entity a second constraint according to the culprit identified in the promise for the supplies and reoptimizing the production associated with meeting the demand from the third party using the second constraint generated according to the culprit identified in the promise for the supplies to generate a new request for the supplies for communication to the supplier.

12. The method of claim 11, further comprising repeating the following until the promise for the supplies satisfies the request for the supplies:

optimizing the production associated with meeting the demand from the third party to generate a request for the supplies needed to meet the demand from the third party;

communicating the request for the supplies to the supplier;

receiving a promise for the supplies from the supplier, the promise for the supplies identifying a culprit as a cause for the promise for the supplies not satisfying the request for the supplies if the promise for the supplies does not satisfy the request for the supplies;

determining whether the promise for the supplies satisfies the request for the supplies; and if the promise for the supplies does not satisfy the request for the supplies, generating a constraint according to the culprit identified in the promise for the supplies and reoptimizing the production associated with meeting the demand from the third part in accordance with the constraint to generate a new request for the supplies for communication to the supplier.

13. The method of claim 11, wherein:

the request for the supplies comprises a first request for a first supply and a second request for a second supply; and the promise for the supplies comprises a first promise for the first supply and a second promise for the second supply, the promise for the supplies identifying the second supply as the culprit identified in the promise for the supplies if the promise for the supplies does not satisfy the request for supplies.

14. The method of claim 13, wherein:

the second promise does not satisfy the second request for the second supply, the promise for the supplies identifying the second supply as the culprit; and reoptimizing the production associated with meeting the demand from the third party to generate a new request for the supplies further comprises using the second promise for the second supply to generate the constraint.

15. The method of claim 11, wherein:

the request for the supplies comprises a bundled request comprising a first request for a first supply and a second request for a second supply; and the promise for the supplies comprises a first promise for the first supply, a second promise for the second supply, and the culprit, the culprit identifying the second promise for the second supply as the cause for the promise for the supplies not satisfying the bundled request.

16. The method of claim 15, wherein reoptimizing the production of the demand to generate a new request for the supplies further comprises using the second promise for the second supply to generate the constraint.

17. The method of claim 15, wherein the bundled request comprises the supplies required for meeting one unit of the demand from the third party.

18. The method of claim 11, wherein:

the promise for the supplies comprises an optimization objective and a promise constraint; and reoptimizing the production associated with meeting the demand from the third party to generate a new request for the supplies further comprises reoptimizing using the promise constraint and the optimization objective.

19. The method of claim 11, wherein:

optimizing the production associated with meeting the demand from the third party to generate a request for the supplies needed to meet the demand from the third party further comprises generating the request for the supplies in accordance with one or more internal resources; and reoptimizing the production associated with meeting the demand from the third party to generate a new request for the supplies further comprises generating the new request for the supplies in accordance with the one or more internal resources.

20. The method of claim 11, wherein determining whether the promise for the supplies satisfies the request for the supplies comprises determining whether the promise for the supplies falls within an acceptable range.

21. The method of claim 11, further comprising communicating a demand promise associated with meeting the demand from the third party to the third party if the promise for the supplies satisfies the request for the supplies.

* * * * *